(12) United States Patent
Hughes et al.

(10) Patent No.: US 9,323,531 B2
(45) Date of Patent: Apr. 26, 2016

(54) SYSTEMS, APPARATUSES, AND METHODS FOR DETERMINING A TRAILING LEAST SIGNIFICANT MASKING BIT OF A WRITEMASK REGISTER

(71) Applicant: Intel Corporation, Santa Clara, CA (US)

(72) Inventors: Christopher J. Hughes, Santa Clara, CA (US); Mark J. Charney, Lexington, MA (US); Jesus Corbal, Barcelona (ES); Milind B. Girkar, Sunnyvale, CA (US); Elmoustapha Ould-Ahmed_Vall, Chandler, AZ (US); Bret L. Toll, Hillsboro, OR (US); Robert Valentine, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 508 days.

(21) Appl. No.: 13/840,809

(22) Filed: Mar. 15, 2013

(65) Prior Publication Data

US 2014/0281401 A1    Sep. 18, 2014

(51) Int. Cl.
*G06F 9/30*    (2006.01)
*G06F 9/40*    (2006.01)
*G06F 15/00*   (2006.01)

(52) U.S. Cl.
CPC ........ *G06F 9/30152* (2013.01); *G06F 9/30018* (2013.01); *G06F 9/30036* (2013.01)

(58) Field of Classification Search
CPC .................................................. G06F 9/30152
USPC ......................................................... 712/210
See application file for complete search history.

(56) References Cited

U.S. PATENT DOCUMENTS

2010/0042789 A1    2/2010 Gonion et al.
2012/0060020 A1    3/2012 Gonion et al.
2013/0145127 A1*   6/2013 Hardage et al. ............... 712/214

FOREIGN PATENT DOCUMENTS

WO    2013/101223 A1    4/2013

OTHER PUBLICATIONS

Office Action in corresponding application JP2014-028431, dated Dec. 2, 2014, 13 pages.

* cited by examiner

*Primary Examiner* — Chun-Kuan Lee
(74) *Attorney, Agent, or Firm* — Nicholson De Vos Webster & Elliott LLP

(57) ABSTRACT

The execution of a KZBTZ finds a trailing least significant zero bit position in an first input mask and sets an output mask to have the values of the first input mask, but with all bit positions closer to the most significant bit position than the trailing least significant zero bit position in an first input mask set to zero. In some embodiments, a second input mask is used as a writemask such that bit positions of the first input mask are not considered in the trailing least significant zero bit position calculation depending upon a corresponding bit position in the second input mask.

20 Claims, 14 Drawing Sheets

| | 7 | | | | | | | 0 |
|---|---|---|---|---|---|---|---|---|
| FIRST WRITEMASK SOURCE 301 | 1 | 1 | 1 | 0 | 0 | 0 | 1 | 1 |
| SECOND WRITEMASK SOURCE 303 | 1 | 0 | 1 | 1 | 0 | 1 | 1 | 1 |
| DESTINATION WRITEMASK 305 | 0 | 0 | 0 | 0 | 0 | 0 | 1 | 1 |

Figure 3(A)

| | | | | | | | | |
|---|---|---|---|---|---|---|---|---|
| FIRST WRITEMASK SOURCE 307 | 1 | 1 | 1 | 0 | 1 | 0 | 1 | 1 |
| SECOND WRITEMASK SOURCE 309 | 1 | 0 | 1 | 1 | 1 | 0 | 1 | 1 |
| DESTINATION WRITEMASK 311 | 0 | 0 | 0 | 1 | 0 | 0 | 1 | 1 |

Figure 3(B)

SYSTEMS, APPARATUSES, AND METHODS FOR DETERMINING A TRAILING LEAST SIGNIFICANT MASKING BIT OF A WRITEMASK REGISTER

FIELD OF INVENTION

The field of invention relates generally to computer processor architecture, and, more specifically, to instructions which when executed cause a particular result.

BACKGROUND

An instruction set, or instruction set architecture (ISA), is the part of the computer architecture related to programming, and may include the native data types, instructions, register architecture, addressing modes, memory architecture, interrupt and exception handling, and external input and output (I/O). It should be noted that the term instruction generally refers herein to a macro-instruction—that is instructions that are provided to the processor for execution—as opposed to micro-instructions or micro-ops—that result from a processor's decoder decoding macro-instructions).

BRIEF DESCRIPTION OF THE DRAWINGS

The present invention is illustrated by way of example and not limitation in the figures of the accompanying drawings, in which like references indicate similar elements and in which:

FIGS. 3(A)-(B) illustrate exemplary operations of KZBTZ.

DETAILED DESCRIPTION

Figure 1:
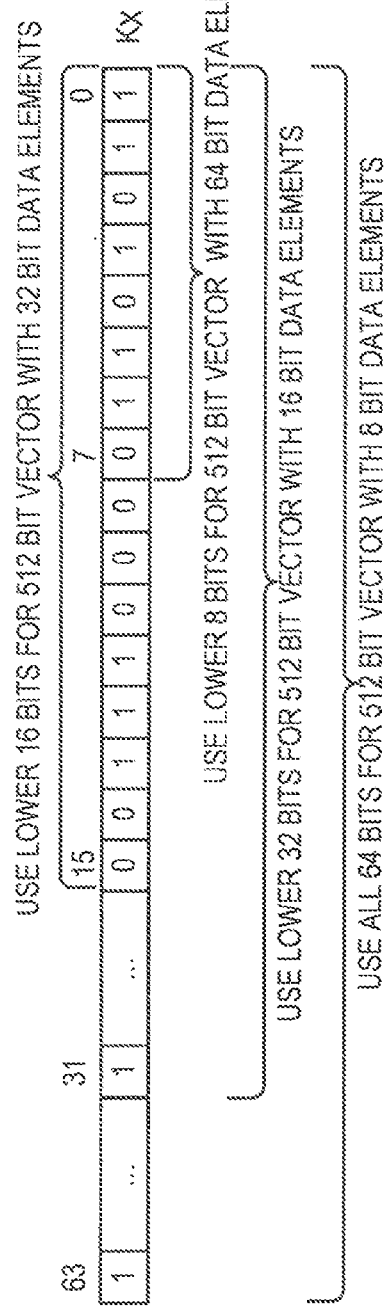
FIG. 1 illustrates a correlation between the number of one active bit vector writemask elements and the vector size and the data element size according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Overview

The instruction set architecture is distinguished from the microarchitecture, which is the internal design of the processor implementing the ISA. Processors with different microarchitectures can share a common instruction set. For example, Intel Pentium 4 processors, Intel Core processors, and Advanced Micro Devices, Inc. of Sunnyvale Calif. processors implement nearly identical versions of the x86 instruction set (with some extensions having been added to newer versions), but have different internal designs. For example, the same register architecture of the ISA may be implemented in different ways in different microarchitectures using well known techniques, including dedicated physical registers, one or more dynamically allocated physical registers using a register renaming mechanism (e.g., the use of a Register Alias Table (RAT), a Reorder Buffer (ROB) and a retirement register file as described in U.S. Pat. No. 5,446,912; the use of multiple maps and a pool of registers as described in U.S. Pat. No. 5,207,132), etc. Unless otherwise specified, the phrases register architecture, register file, and register refer to that which is visible to the software/programmer and the manner in which instructions specify registers. Where specificity is desired, the adjective logical, architectural, or software visible will be used to indicate registers/files in the register architecture, while different adjectives will be used to designate registers in a given microarchitecture (e.g., physical register, reorder buffer, retirement register, register pool).

An instruction set includes one or more instruction formats. A given instruction format defines various fields (number of bits, location of bits) to specify, among other things, the operation to be performed and the operand(s) on which that operation is to be performed. A given instruction is expressed using a given instruction format and specifies the operation and the operands. An instruction stream is a specific sequence of instructions, where each instruction in the sequence is an occurrence of an instruction in an instruction format.

Scientific, financial, auto-vectorized general purpose, RMS (recognition, mining, and synthesis)/visual and multimedia applications (e.g., 2D/3D graphics, image processing, video compression/decompression, voice recognition algorithms and audio manipulation) often require the same operation to be performed on a large number of data items (referred to as "data parallelism"). Single Instruction Multiple Data (SIMD) refers to a type of instruction that causes a processor to perform the same operation on multiple data items. SIMD technology is especially suited to processors that can logically divide the bits in a register into a number of fixed-sized data elements, each of which represents a separate value. For example, the bits in a 64-bit register may be specified as a source operand to be operated on as four separate 16-bit data elements, each of which represents a separate 16-bit value. As another example, the bits in a 256-bit register may be specified as a source operand to be operated on as four separate 64-bit packed data elements (quad-word (Q) size data elements), eight separate 32-bit packed data elements (double word (D) size data elements), sixteen separate 16-bit packed data elements (word (W) size data elements), or thirty-two separate 8-bit data elements (byte (B) size data elements). This type of data is referred to as the packed data type or vector data type, and operands of this data type are referred to as packed data operands or vector operands. In other words, a packed data item or vector refers to a sequence of packed data elements; and a packed data operand or a vector operand is a source or destination operand of a SIMD instruction (also known as a packed data instruction or a vector instruction).

By way of example, one type of SIMD instruction specifies a single vector operation to be performed on two source vector operands in a vertical fashion to generate a destination vector operand (also referred to as a result vector operand) of the same size, with the same number of data elements, and in the same data element order. The data elements in the source vector operands are referred to as source data elements, while the data elements in the destination vector operand are referred to a destination or result data elements. These source vector operands are of the same size and contain data elements of the same width, and thus they contain the same number of data elements. The source data elements in the same bit positions in the two source vector operands form pairs of data elements (also referred to as corresponding data elements; that is, the data element in data element position 0 of each source operand correspond, the data element in data element position 1 of each source operand correspond, and so on). The operation specified by that SIMD instruction is performed separately on each of these pairs of source data elements to generate a matching number of result data elements, and thus each pair of source data elements has a corresponding result data element. Since the operation is vertical and since the result vector operand is the same size, has the same number of data elements, and the result data elements are stored in the same data element order as the source vector operands, the result data elements are in the same bit positions of the result vector operand as their corresponding pair of source data elements in the source vector operands. In addition to this exemplary type of SIMD instruction, there are a variety of other types of SIMD instructions (e.g., that have only one or has more than two source vector operands; that operate in a horizontal fashion; that generate a result vector operand that is of a different size, that have a different size of data elements, and/or that have a different data element order). It should be understood that the term destination vector operand (or destination operand) is defined as the direct result of performing the operation specified by an instruction, including the storage of that destination operand at a location (be it a register or at a memory address specified by that instruction) so that it may be accessed as a source operand by another instruction (by specification of that same location by the another instruction.

The SIMD technology, such as that employed by the Intel® Core™ processors having an instruction set including x86, MMX™, Streaming SIMD Extensions (SSE), SSE2, SSE3, SSE4.1, and SSE4.2 instructions, has enabled a significant improvement in application performance (Core™ and MMX™ are registered trademarks or trademarks of Intel Corporation of Santa Clara, Calif.). An additional set of SIMD extensions, referred to the Advanced Vector Extensions (AVX) (AVX1 and AVX2) and using the VEX coding scheme, has been released and/or published (e.g., see Intel® 64 and IA-32 Architectures Software Developers Manual, October 2011; and see Intel® Advanced Vector Extensions Programming Reference, June 2011).

In the description below, there are some items that may need explanation prior to describing the operations of this particular instruction in the instruction set architecture. One such item is called a "writemask register" which is generally used to predicate an operand to conditionally control per-element computational operation (below, the term mask register may also be used and it refers to a writemask register such as the "k" registers discussed below). As used below, a writemask register stores a plurality of bits (16, 32, 64, etc.) wherein each active bit of the writemask register governs the operation/update of a packed data element of a vector register during SIMD processing. Typically, there is more than one writemask register available for use by a processor core.

The instruction set architecture includes at least some SIMD instructions that specify vector operations and that have fields to select source registers and/or destination registers from these vector registers (an exemplary SIMD instruction may specify a vector operation to be performed on the contents of one or more of the vector registers, and the result of that vector operation to be stored in one of the vector registers). Different embodiments of the invention may have different sized vector registers and support more/less/different sized data elements.

The size of the multi-bit data elements specified by a SIMD instruction (e.g., byte, word, double word, quad word) determines the bit locations of the "data element positions" within a vector register, and the size of the vector operand determines the number of data elements. A packed data element refers to the data stored in a particular position. In other words, depending on the size of the data elements in the destination operand and the size of the destination operand (the total number of bits in the destination operand) (or put another way, depending on the size of the destination operand and the number of data elements within the destination operand), the bit locations of the multi-bit data element positions within the resulting vector operand change (e.g., if the destination for the resulting vector operand is a vector register (in this discussion vector registers and packed data element registers are used interchangeably), then the bit locations of the multi-bit data element positions within the destination vector register change). For example, the bit locations of the multi-bit data elements are different between a vector operation that operates on 32-bit data elements (data element position 0 occupies bit locations 31:0, data element position 1 occupies bit locations 63:32, and so on) and a vector operation that operates on 64-bit data elements (data element position 0 occupies bit locations 63:0, data element position 1 occupies bit locations 127:64, and so on).

Additionally, there is a correlation between the number of one active bit vector writemask elements and the vector size and the data element size according to one embodiment of the invention as shown in FIG. 1. Vector sizes of 128-bits, 256-bits, and 512-bits are shown, although other widths are also possible. Data element sizes of 8-bit bytes (B), 16-bit words (W), 32-bit doublewords (D) or single precision floating point, and 64-bit quadwords (Q) or double precision floating point are considered, although other widths are also possible. As shown, when the vector size is 128-bits, 16-bits may be used for masking when the vector's data element size is 8-bits, 8-bits may be used for masking when the vector's data element size is 16-bits, 4-bits may be used for masking when the vector's data element size is 32-bits, and 2-bits may be used for masking when the vector's data element size is 64-bits. When the vector size is 256-bits, 32-bits may be used for masking when the packed data element width is 8-bits, 16-bits may be used for masking when the vector's data element size is 16-bits, 8-bits may be used for masking when the vector's data element size is 32-bits, and 4-bits may be used for masking when the vector's data element size is 64-bits. When the vector size is 512-bits, 64-bits may be used for masking when the vector's data element size is 8-bits, 32-bits may be used for masking when the vector's data element size is 16-bits, 16-bits may be used for masking when the vector's data element size is 32-bits, and 8-bits may be used for masking when the vector's data element size is 64-bits.

Depending upon the combination of the vector size and the data element size, either all 64-bits, or only a subset of the 64-bits, may be used as a write mask. Generally, when a single, per-element masking control bit is used, the number of bits in the vector writemask register used for masking (active bits) is equal to the vector size in bits divided by the vector's data element size in bits.

As noted above, writemask registers contain mask bits that correspond to elements in a vector register (or memory location) and track the elements upon which operations should be performed. For this reason, it is desirable to have common operations which replicate similar behavior on these mask bits as for the vector registers and in general allow one to adjust these mask bits within the writemask registers.

Figure 2:
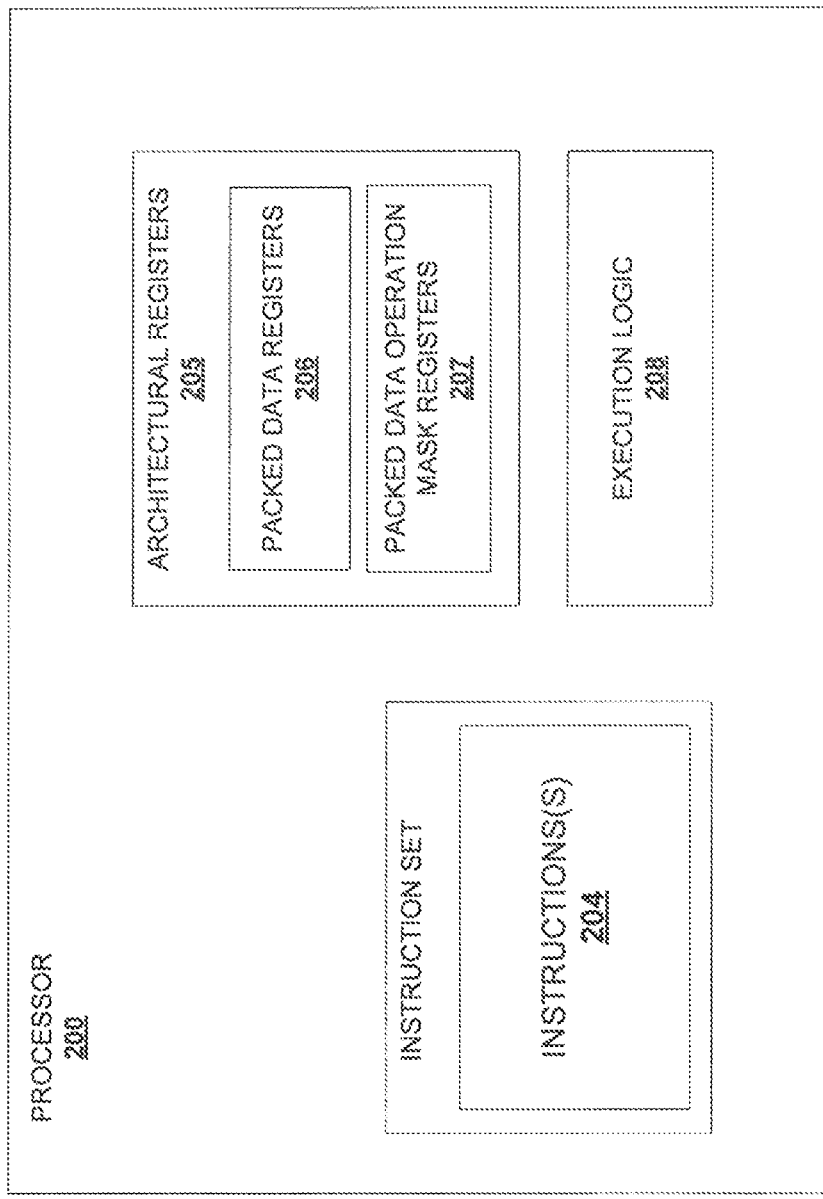
FIG. 2 is a block diagram of an exemplary embodiment of a processor (processor core) to execute one or more instructions.

FIG. 2 is a block diagram of an exemplary embodiment of a processor (processor core) 200 to execute one or more KZBTZ instructions 204. In some embodiments, the processor may be a general-purpose processor (e.g., of the type used in desktop, laptop, servers, and like computers). Alternatively, the processor may be a special-purpose processor. Examples of suitable special-purpose processors include, but are not limited to, network processors, communications processors, cryptographic processors, graphics processors, coprocessors, embedded processors, digital signal processors (DSPs), and controllers, to name just a few examples. The processor may be any of various complex instruction set computing (CISC) processors, various reduced instruction set computing (RISC) processors, various very long instruction word (VLIW) processors, various hybrids thereof, or other types of processors entirely.

The processor 200 includes architecturally-visible registers (e.g., an architectural register file) 205. The architectural registers may also be referred to herein simply as registers. Unless otherwise specified or apparent, the phrases architectural register, register file, and register are used herein to refer to registers that are visible to the software and/or programmer and/or the registers that are specified by macroinstructions or assembly language instructions to identify operands. These registers are contrasted to other non-architectural or non-architecturally visible registers in a given microarchitecture (e.g., temporary registers used by instructions, reorder buffers, retirement registers, etc.). The registers generally represent on-die processor storage locations. The illustrated architectural registers include packed data registers 206. Each of the packed data registers may be operable to store packed or vector data. The illustrated architectural registers also include packed data operation mask registers 207. Each of the packed data operation mask registers may be operable to store a packed data operation mask. These registers may be referred to as writemask registers in this description. Packed data operands may be stored in the packed data registers 207.

The processor also includes execution logic 208. The execution logic is operable to execute or process the one or more KZBTZ instructions 204. In some embodiments, the execution logic may include particular logic (e.g., particular circuitry or hardware potentially combined with firmware) to execute these instructions.

An important algorithmic pattern that to efficiently vectorize is computations involving both reads and writes from/to indirect memory locations. For example, copying A[B[i]] to A[C[i]]. Vectorizing this type of loop involves doing gather and scatter operations on multiple index vectors (i.e., the B[i] and C[i]). However, this vectorization assumes that no memory dependences are violated by doing multiple reads and writes simultaneously. If, for example, a group of SIMD width elements from B[i] holds a common value with C[i], then we may violate a read-after-write dependence. More concretely, if B[0]=0, B[1]=1, C[0]=1, and C[1]=2, then the read of A[B[1]] must follow the write to A[C[0]]. Doing all of the reads simultaneously with a gather instruction, then all of the writes with a scatter instruction violates this dependence, and may result in an incorrect answer.

To help solve this problem, an instruction called vconflict compares each element of a first vector with all elements of a second vector, and outputs the comparison results as a set of bit vectors into a vector register. The idea is to detect "conflicts," or matching indices across different gathers/scatters. If there any conflicts, then a computation on a given group of SIMD-width elements iteratively performed, performing as many elements as possible simultaneously, as illustrated in the pseudo-code below.

```
for (i=0; i<N; i+=SIMD_WIDTH) {
    gather_indices = vload(&B[i]);
    scatter_indices = vload(&C[i]);
    comparisons = vconflict(gather_indices, scatter_indices);
    elements_left_mask = all_ones;
    do {
        do_these =
        Compute_Mask_of_Non_Conflicting_Elements(comparisons,
    elements_left_mask);
        Gather_Compute_Scatter(gather_indices, scatter_indices,
        do_these);
        elements_left_mask ^= do_these;
    } while (elements_left_mask != 0);
}
```

The "Compute_Mask_of_Non_Conflicting_Elements" is a non-trivial operation. Existing instructions, in conjunction with vconflict, all share one problem—they cannot detect all possible data dependences within two sets of indices without executing multiple instances of vconflict, and additional manipulation of the comparison results. In particular, in the example above, we show how we must detect duplicate indices between the gather and scatter index vectors to detect read-after-write (RAW) dependences. However, the proposed solution to enforcing these dependences, delaying the processing of some elements, can cause a violation of write-after-write (WAW) or write-after-read (WAR) dependences. For example, assume that B[0]=0, B[1]=1, B[2]=2, C[0]=1, C[1]=3, and C[2]=3. Just like in the example above, the second iteration has a RAW dependence on the first iteration, so it must be delayed. The third iteration has no RAW dependence, and so a there may be a choice to execute it simultaneously with the first iteration. However, if this is done, then the write to A[C[2]] (=A[3]) will happen before the write to A[C[1]] (=A[3]), and will violate a WAW dependence.

Below are embodiments of an instruction generically called a zero mask before trailing zero ("KZBTZ") instruction of the instruction set and embodiments of systems, architectures, instruction formats, etc. that may be used to execute such an instruction. The execution of a KZBTZ finds a trailing least significant zero bit position in an first input mask and sets an output mask to have the values of the first input mask, but with all bit positions closer to the most significant bit position than the trailing least significant zero bit position in an first input mask set to zero. In some embodiments, a second input mask is used as a writemask such that bit positions of the first input mask are not considered in the trailing least significant zero bit position calculation depending upon a corresponding bit position in the second input mask.

FIGS. 3(A)-(B) illustrate exemplary operations of KZBTZ. In FIG. 3(A), there are two source writemask registers 301 and 303 and a destination writemask 305. The first "0" value in the first source writemask register 301 appears in the third bit position (SRC1[2]). At a corresponding bit position of the second source writemask register 303, the value is a "1" meaning that this bit position is the first bit position that was both a zero in the first source writemask register 301 and enabled in the second source writemask register 303. The destination writemask register 305 therefore has the contents of the first writemask register 301 up until bit position 3 and at that bit position and bit positions that are more significant, the destination writemask register 305 are set to be 0.

In FIG. 3(B), there are two source writemask registers 307 and 309 and a destination writemask 311. The first "0" value in the first source writemask register 307 appears in the third bit position (SRC1[2]). At a corresponding bit position of the second source writemask register 309, the value is a "0" meaning that this bit position is not be evaluated as being the trailing least significant zero bit position. The first bit position that meets both requirements is bit position 4 (SRC1[3] and SRC2[3]). The destination writemask register 311 therefore has the contents of the first writemask register 307 up until bit position 4 and at that bit position and bit positions that are more significant, the destination writemask register 311 are set to be 0.

Exemplary Format of KZBTZ

An exemplary format of this instruction is "KZBTZ K1, K2, K3" where the destination operand K1 is writemask register, K2 and K3 are source writemask registers and KZBTZ is the instruction's opcode. In some embodiments, K1, K2, and K3 are dedicated writemask registers as detailed above. In other embodiments, K1, K2, and K3 are general purpose registers.

Exemplary Methods of Execution of KZBTZ

Figure 4:
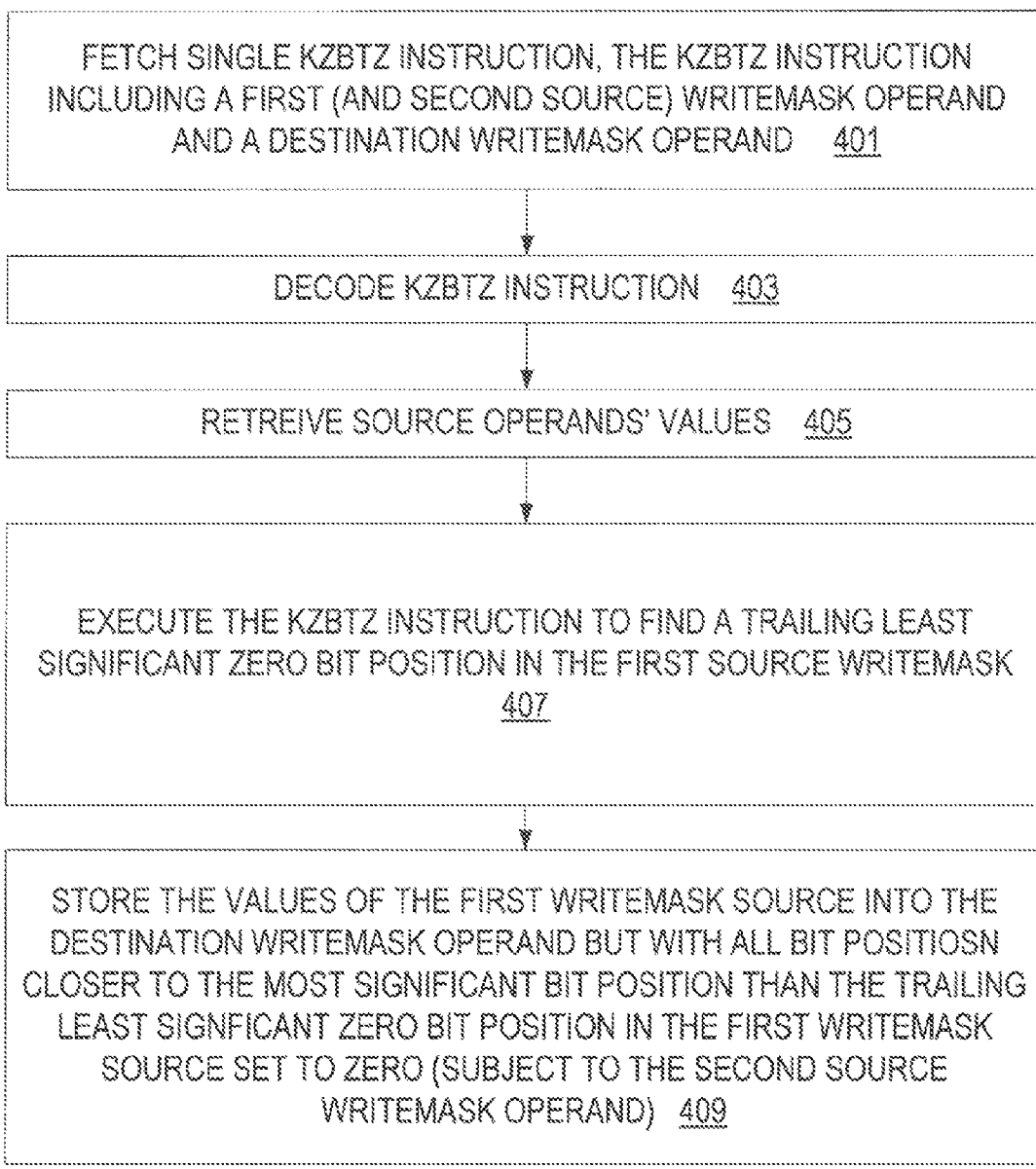
FIG. 4 illustrates an embodiment of the execution of a KZBTZ instruction in a processor.

FIG. 4 illustrates an embodiment of the execution of a KZBTZ instruction in a processor. A KZBTZ instruction with a first and second source writemask operand, a destination writemask operand, and an opcode is fetched at 401.

The KZBTZ instruction is decoded by decoding logic at 403.

The source operands' values are retrieved/read at 405. For example, the source writemask registers are read.

The decoded KZBTZ instruction (or operations comprising such an instruction such as microoperations) is executed by execution resources such as one or more functional units at 407 to find a least significant zero bit position in the first source writemask operand that has a one value in a corresponding bit position of the second source writemask operand. This bit position signifies a trailing least significant zero bit position. Examples of this are found in FIG. 3.

The values up to, but not including, the trailing least significant zero bit position are stored into the destination writemask operand at corresponding bit positions at 409. Additionally, the remaining bit positions of the destination writemask operand are set to 0. While 407 and 409 have been illustrated separately, in some embodiments they are performed together as a part of the execution of the instruction.

Figure 5:
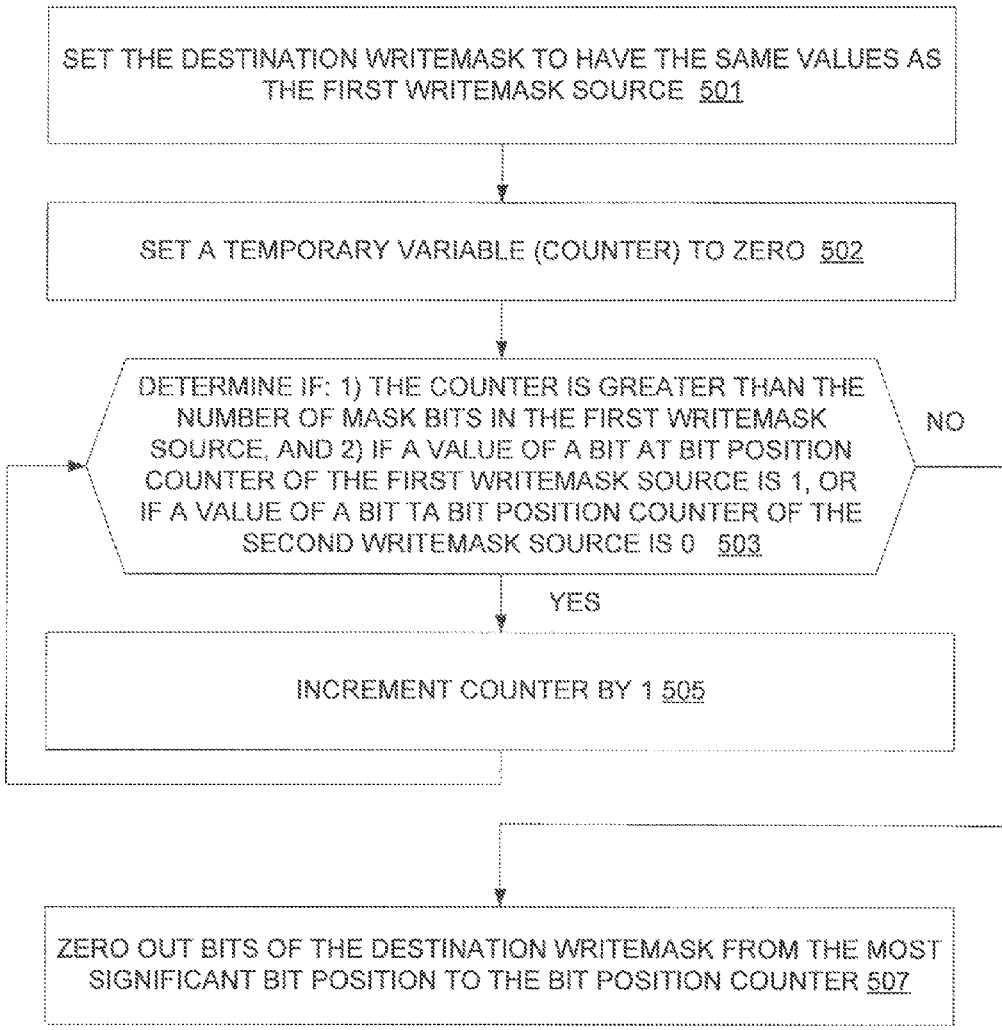
FIG. 5 illustrates an embodiment of a method for processing a KZBTZ instruction.

FIG. 5 illustrates an embodiment of a method for processing a KZBTZ instruction. In this embodiment it is assumed that some, if not all, of the operations 401-405 have been performed earlier, however, they are not shown in order to not obscure the details presented below. For example, the fetching and decoding are not shown, nor is the operand retrieval shown. In this example, each bit position is processed in parallel, however, bit positions may be evaluated serially as well.

At 501, the contents of the first source writemask register are written to the destination writemask register. In some embodiments, the contents are of the first source writemask register are alternatively written into a temporary register or other data structure.

A temporary variable is set to 0 at 502. This temporary variable is used as a counter to determine if the number of determinations in 503 have exceeded the number of bit positions in the first source writemask register.

At 503, a determination is made of if: 1) the counter less than the number of bit positions in the first writemask source register; 2) a bit value in a counter value bit position of the first source writemask register is 1, or 3) a bit value in a counter value bit position of the second source writemask register is 1. If any of these determinations are false, then the next step is to zero out all of the bit positions of the destination writemask register from the counter value bit position to the most significant bit position at 507. A false to the counter determination means that the entire first writemask has been evaluated and no trailing least significant zero bit position has been found. A false indication to the value stored in the bit position of the first source writemask not being 1 is therefore an indication of a zero value. When the value stored in the same bit position of the second source writemask register is a 1, then the trailing least significant zero bit position has been found.

If any of these determinations are true, then the next step is to increase the counter at 505 and do the determinations of 503 again.

An exemplary use of KZBTZ is discussed below. In this example, a solution is to the above is to not allow execution of later iterations before earlier iterations; thus, vector/SIMD execution must stop at the first RAW dependence. If the input mask k2 is a mask that has bits set for elements we still need to compute that have no remaining RAW dependences, and input mask k3 a mask that indicates all elements still needed to compute, it will find the earliest element with a RAW conflict and zero out all bits for later elements. This leads to the following algorithm for vectorizing loops like this:

```
for (i=0; i<N; i+=SIMD_WIDTH) {
    gather_indices = vload(&B[i]);
    scatter_indices = vload(&C[i]);
    comparisons = vconflict(gather_indices, scatter_indices);
    elements_left_mask = all_ones;
    do {
        no_raw_mask =
        Compute_Mask_of_Elements_w/o_RAW_Dependence
        (comparisons, elements_left_mask);
        stop_at_first_conf_mask =
        kzbtz(no_raw_mask, elements_left_mask);
```

-continued

```
        Gather_Compute_Scatter(gather_indices, scatter_indices,
        stop_at_first_conf_mask);
            elements_left_mask ^= stop_at_first_conf_mask;
    } while (elements_left_mask != 0);
}
```

Exemplary Register Architecture

Figure 6:
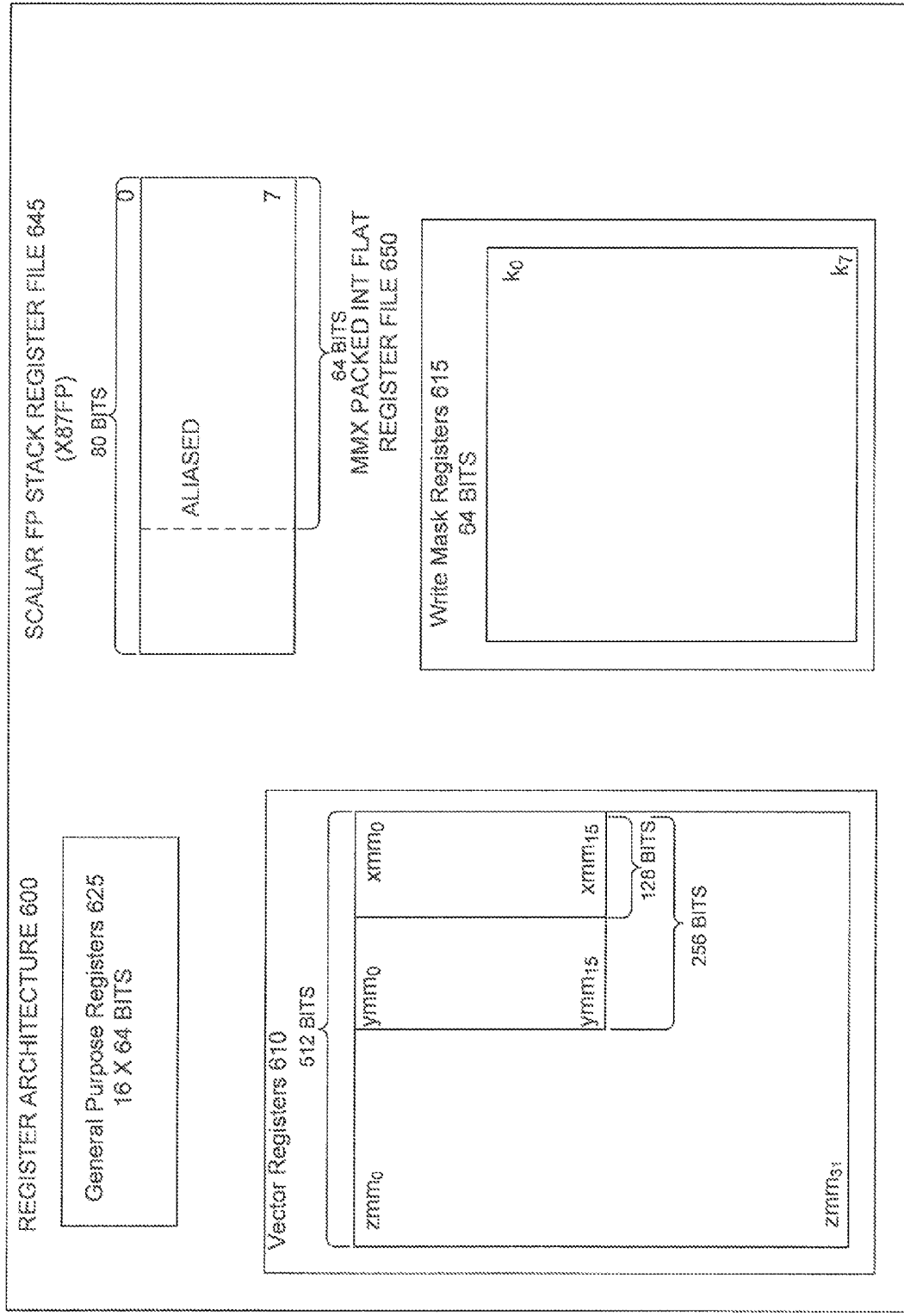
FIG. 6 is a block diagram of a register architecture 600 according to one embodiment of the invention.

FIG. 6 is a block diagram of a register architecture 600 according to one embodiment of the invention. In the embodiment illustrated, there are 32 vector registers 610 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

General-purpose registers 625—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 645, on which is aliased the MMX packed integer flat register file 650—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-order and out-of-order core block diagram

Figure 7:
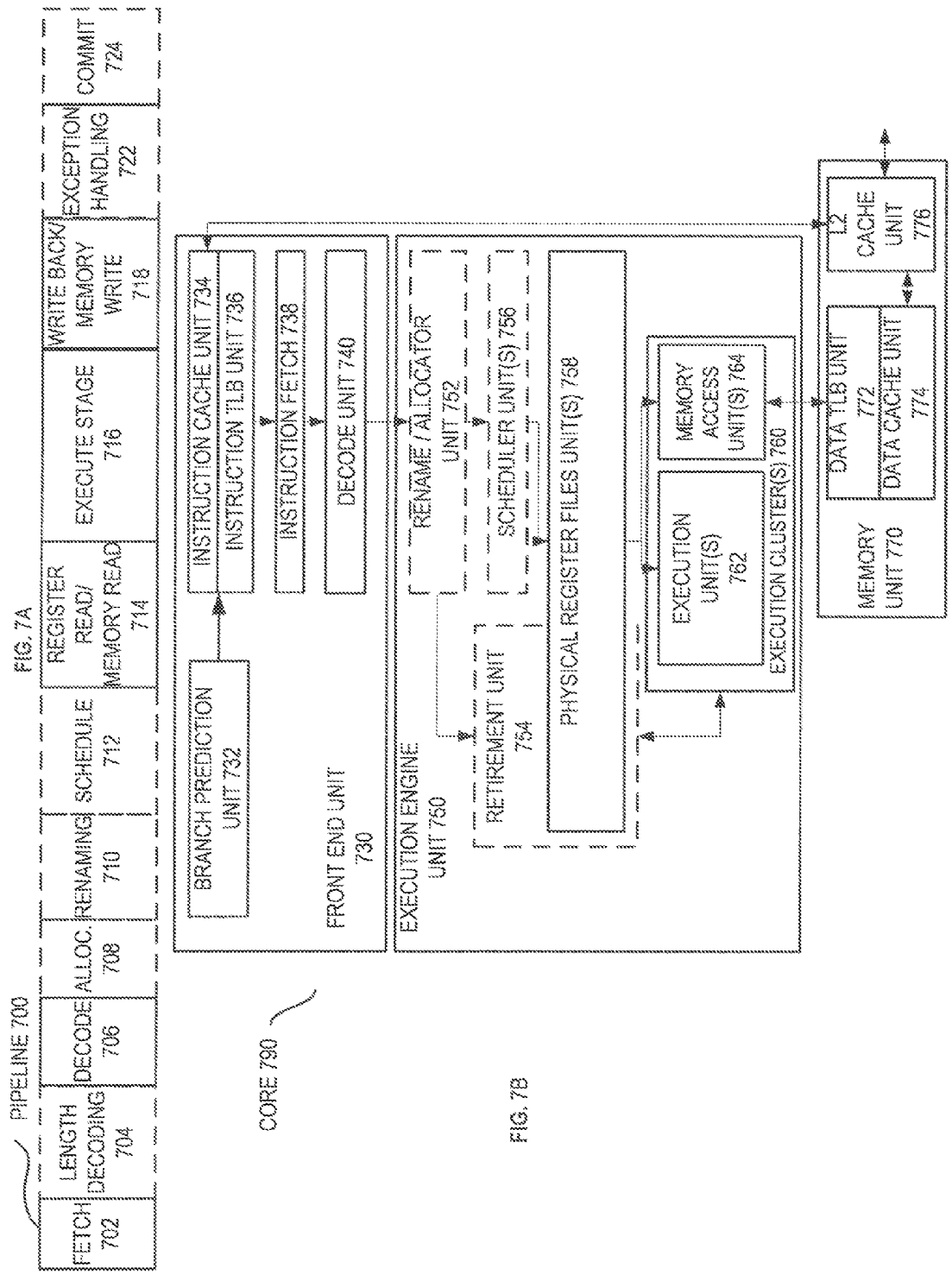
FIG. 7A is a block diagram illustrating both an exemplary in-order pipeline and an exemplary register renaming, out-of-order issue/execution pipeline according to embodiments of the invention.
FIG. 7B is a block diagram illustrating both an exemplary embodiment of an in-order architecture core and an exemplary register renaming, out-of-order issue/execution architecture core to be included in a processor according to embodiments of the invention.

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline QAE00 includes a fetch stage QAE02, a length decode stage QAE04, a decode stage QAE06, an allocation stage QAE08, a renaming stage QAE10, a scheduling (also known as a dispatch or issue) stage QAE12, a register read/memory read stage QAE14, an execute stage QAE16, a write back/memory write stage QAE18, an exception handling stage QAE22, and a commit stage QAE24.

FIG. 7B shows processor core QAE90 including a front end unit QAE30 coupled to an execution engine unit QAE50, and both are coupled to a memory unit QAE70. The core QAE90 may be a reduced instruction set computing (RISC) core, a complex instruction set computing (CISC) core, a very long instruction word (VLIW) core, or a hybrid or alternative core type. As yet another option, the core QAE90 may be a special-purpose core, such as, for example, a network or communication core, compression engine, coprocessor core, general purpose computing graphics processing unit (GPGPU) core, graphics core, or the like.

The front end unit QAE30 includes a branch prediction unit QAE32 coupled to an instruction cache unit QAE34, which is coupled to an instruction translation lookaside buffer (TLB) QAE36, which is coupled to an instruction fetch unit QAE38, which is coupled to a decode unit QAE40. The decode unit QAE40 (or decoder) may decode instructions, and generate as an output one or more micro-operations, micro-code entry points, microinstructions, other instructions, or other control signals, which are decoded from, or which otherwise reflect, or are derived from, the original instructions. The decode unit QAE40 may be implemented using various different mechanisms. Examples of suitable mechanisms include, but are not limited to, look-up tables, hardware implementations, programmable logic arrays (PLAs), microcode read only memories (ROMs), etc. In one embodiment, the core QAE90 includes a microcode ROM or other medium that stores microcode for certain macroinstructions (e.g., in decode unit QAE40 or otherwise within the front end unit QAE30). The decode unit QAE40 is coupled to a rename/allocator unit QAE52 in the execution engine unit QAE50.

The execution engine unit QAE50 includes the rename/allocator unit QAE52 coupled to a retirement unit QAE54 and a set of one or more scheduler unit(s) QAE56. The scheduler unit(s) QAE56 represents any number of different schedulers, including reservations stations, central instruction window, etc. The scheduler unit(s) QAE56 is coupled to the physical register file(s) unit(s) QAE58. Each of the physical register file(s) units QAE58 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit QAE58 comprises a vector registers unit and a scalar registers unit. These register units may provide architectural vector registers, vector mask registers, and general purpose registers. The physical register file(s) unit(s) QAE58 is overlapped by the retirement unit QAE54 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit QAE54 and the physical register file(s) unit(s) QAE58 are coupled to the execution cluster(s) QAE60. The execution cluster(s) QAE60 includes a set of one or more execution units QAE62 and a set of one or more memory access units QAE64. The execution units QAE62 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) QAE56, physical register file(s) unit(s) QAE58, and execution cluster(s) QAE60 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) QAE64). It should also be understood that where separate pipelines are used, one or more of these pipelines may be out-of-order issue/execution and the rest in-order.

The set of memory access units QAE64 is coupled to the memory unit QAE70, which includes a data TLB unit QAE72 coupled to a data cache unit QAE74 coupled to a level 2 (L2) cache unit QAE76. In one exemplary embodiment, the memory access units QAE64 may include a load unit, a store address unit, and a store data unit, each of which is coupled to the data TLB unit QAE72 in the memory unit QAE70. The instruction cache unit QAE34 is further coupled to a level 2 (L2) cache unit QAE76 in the memory unit QAE70. The L2 cache unit QAE76 is coupled to one or more other levels of cache and eventually to a main memory.

By way of example, the exemplary register renaming, out-of-order issue/execution core architecture may implement the pipeline QAE00 as follows: 1) the instruction fetch QAE38 performs the fetch and length decoding stages QAE02 and QAE04; 2) the decode unit QAE40 performs the decode stage QAE06; 3) the rename/allocator unit QAE52 performs the allocation stage QAE08 and renaming stage QAE10; 4) the scheduler unit(s) QAE56 performs the schedule stage QAE12; 5) the physical register file(s) unit(s) QAE58 and the memory unit QAE70 perform the register read/memory read stage QAE14; the execution cluster QAE60 perform the execute stage QAE16; 6) the memory unit QAE70 and the physical register file(s) unit(s) QAE58 perform the write back/memory write stage QAE18; 7) various units may be involved in the exception handling stage QAE22; and 8) the retirement unit QAE54 and the physical register file(s) unit(s) QAE58 perform the commit stage QAE24.

The core QAE90 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core QAE90 includes logic to support a packed data instruction set extension (e.g., AVX1, AVX2, and/or some form of the generic vector friendly instruction format (U=0 and/or U=1) previously described), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units QAE34/QAE74 and a shared L2 cache unit QAE76, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 8:
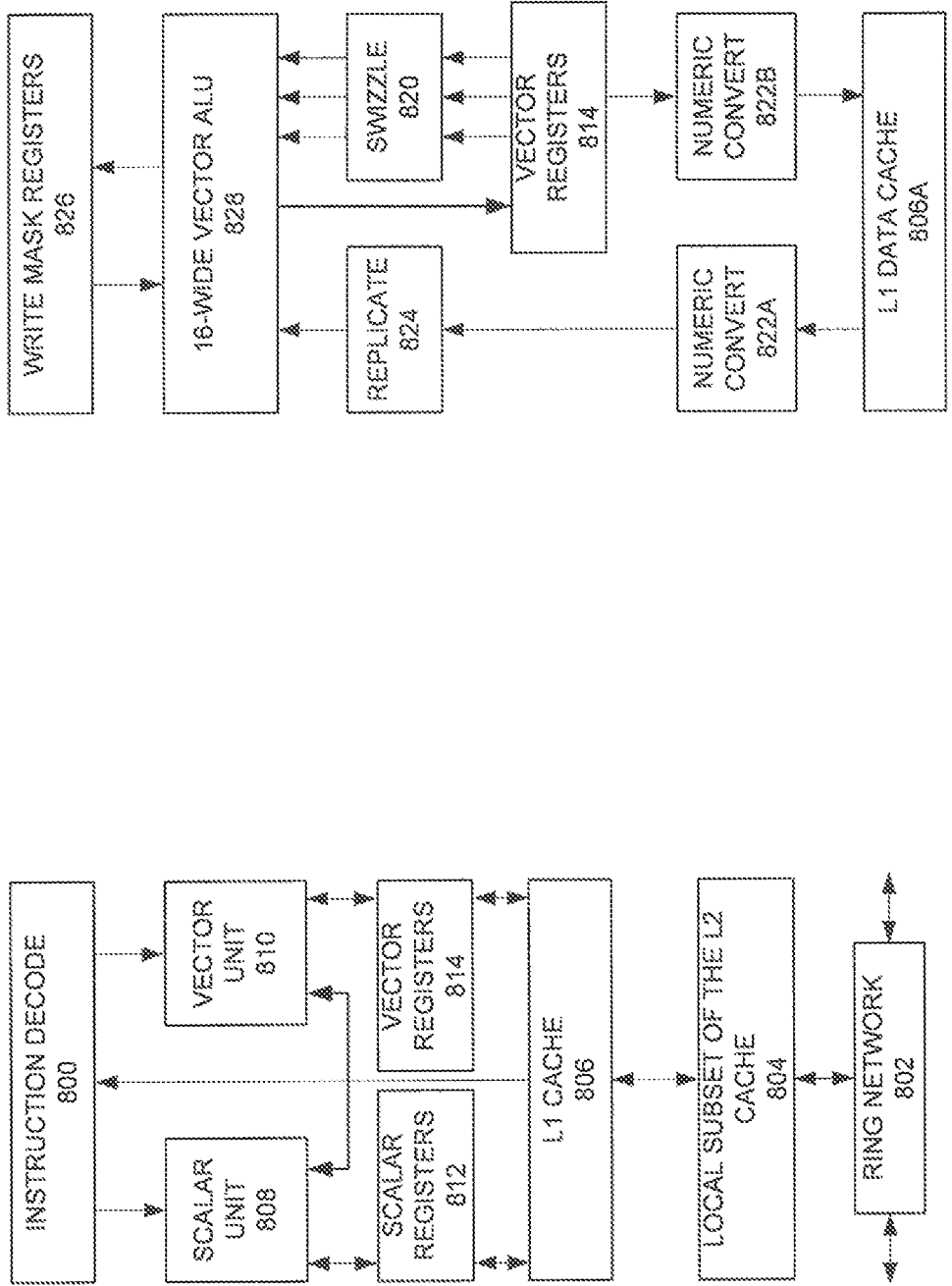
FIGS. 8(A)-(B) illustrate a block diagram of a more specific exemplary in-order core architecture, which core would be one of several logic blocks (including other cores of the same type and/or different types) in a chip.

FIGS. 8(A)-(B) illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the invention. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the invention may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 8B is an expanded view of part of the processor core in FIG. 8A according to embodiments of the invention. FIG. 8B includes an L1 data cache 806A part of the L1 cache 804, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input.

Processor with Integrated Memory Controller and Graphics

Figure 9:
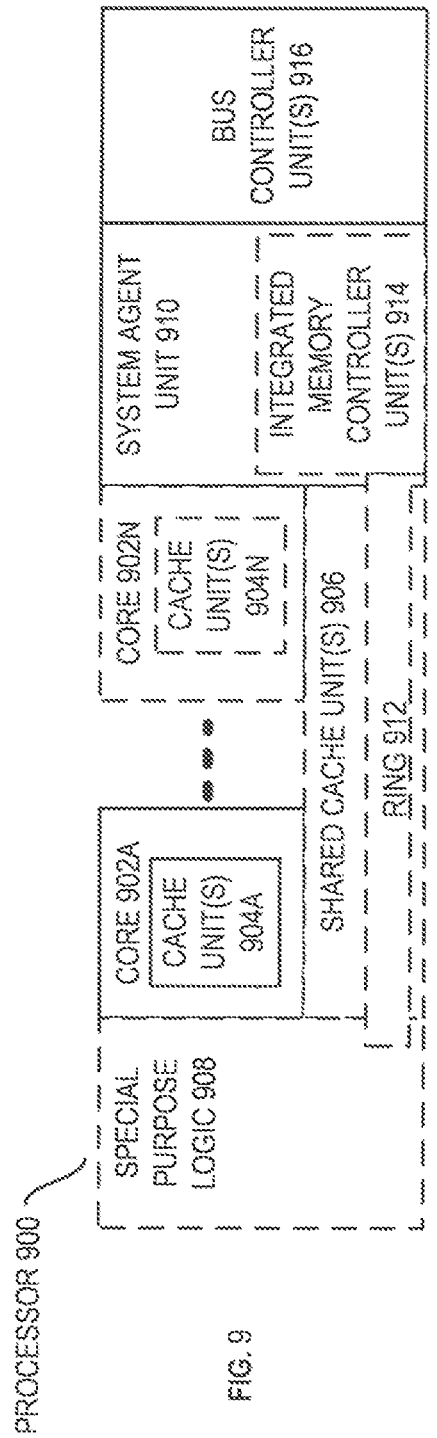
FIG. 9 is a block diagram of a processor 900 that may have more than one core, may have an integrated memory controller, and may have integrated graphics according to embodiments of the invention.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902-A-N.

In some embodiments, one or more of the cores 902A-N are capable of multithreading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
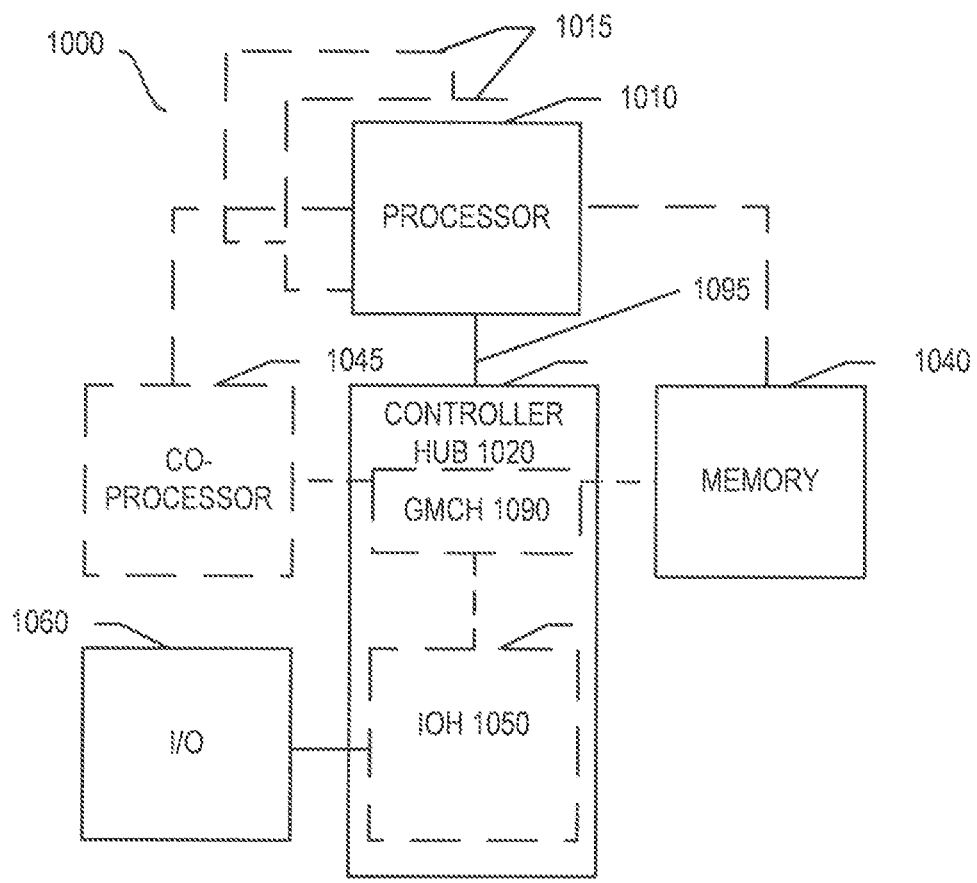
FIGS. 10-13 are block diagrams of exemplary computer architectures.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
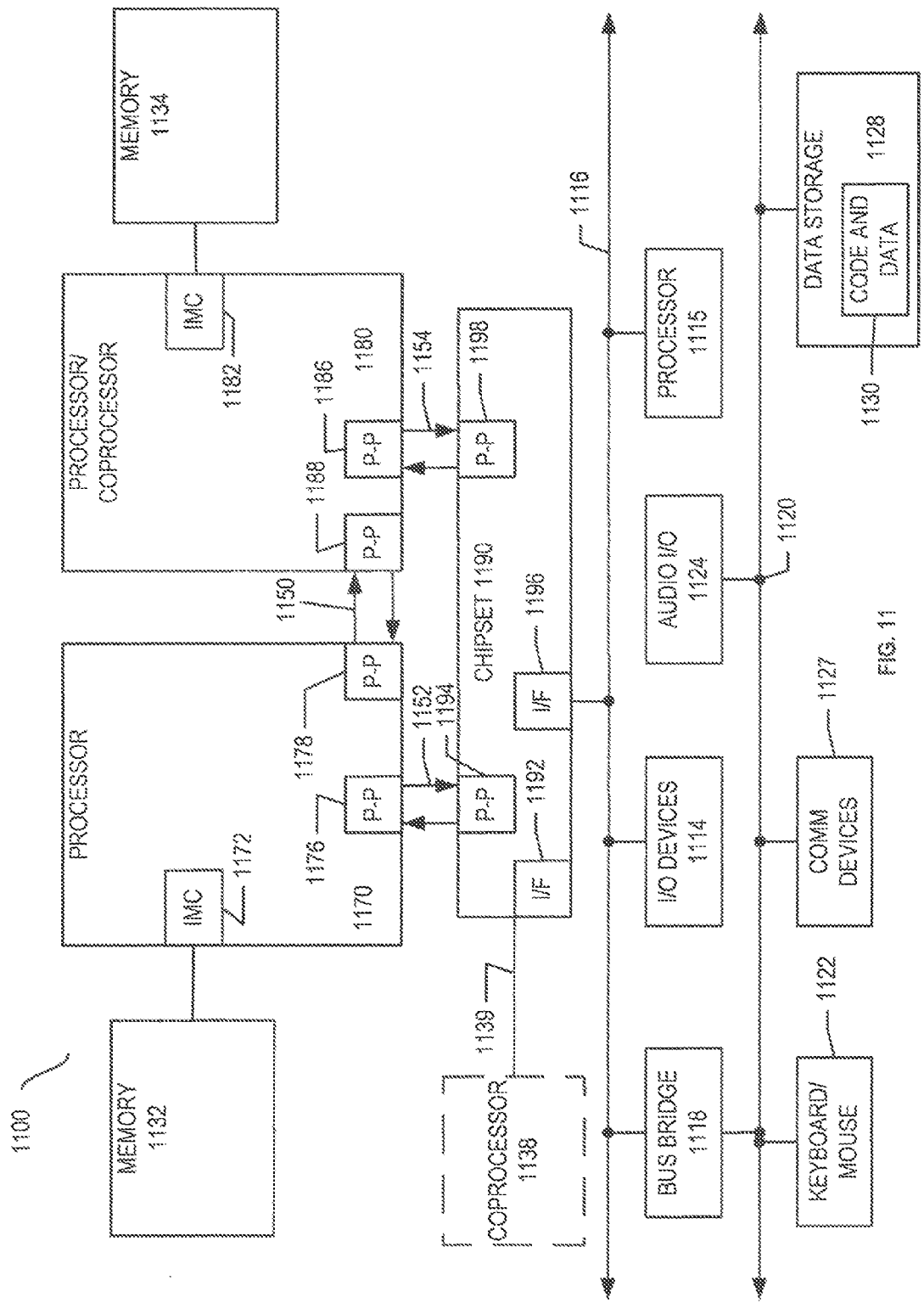

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
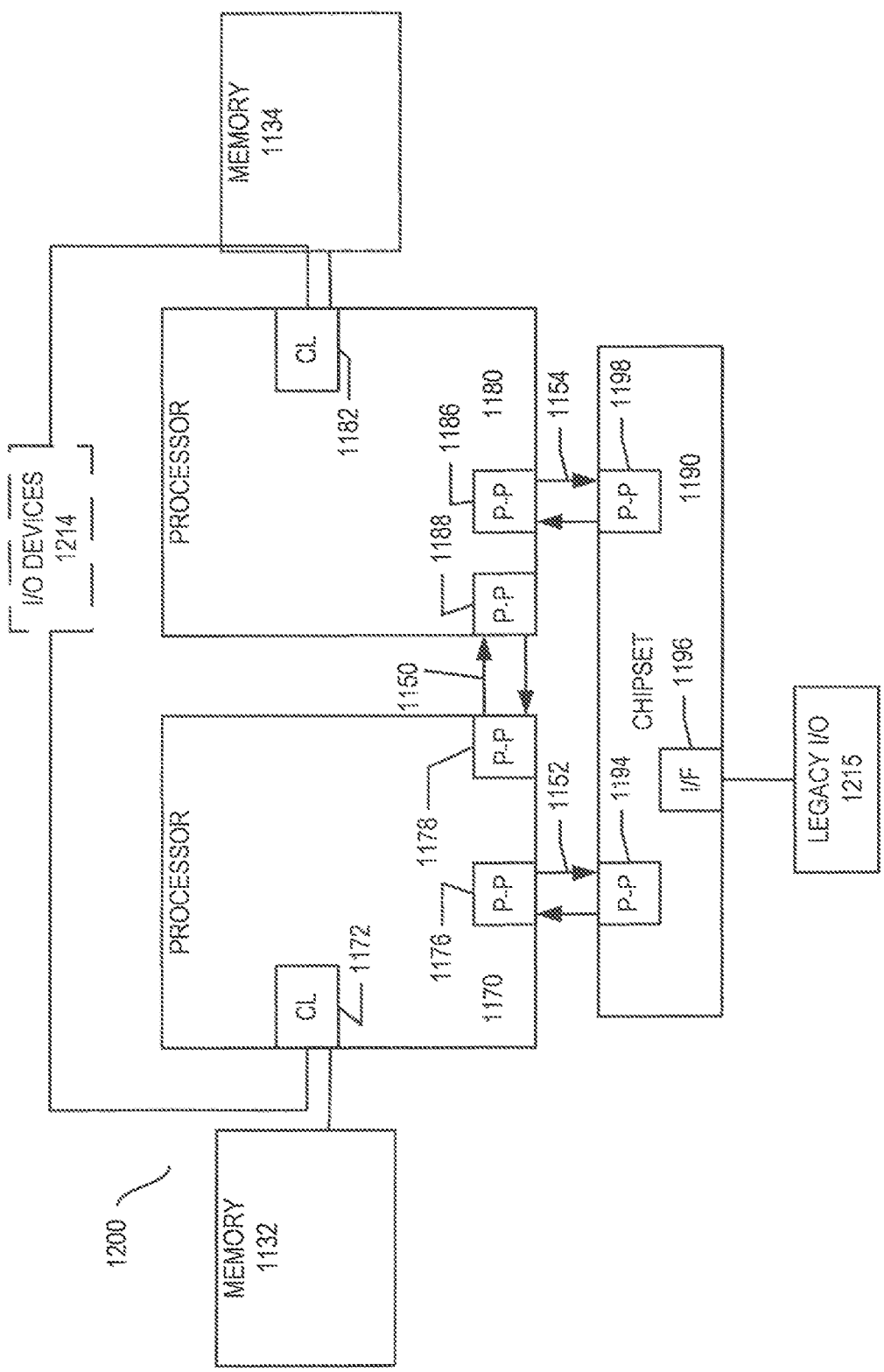

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
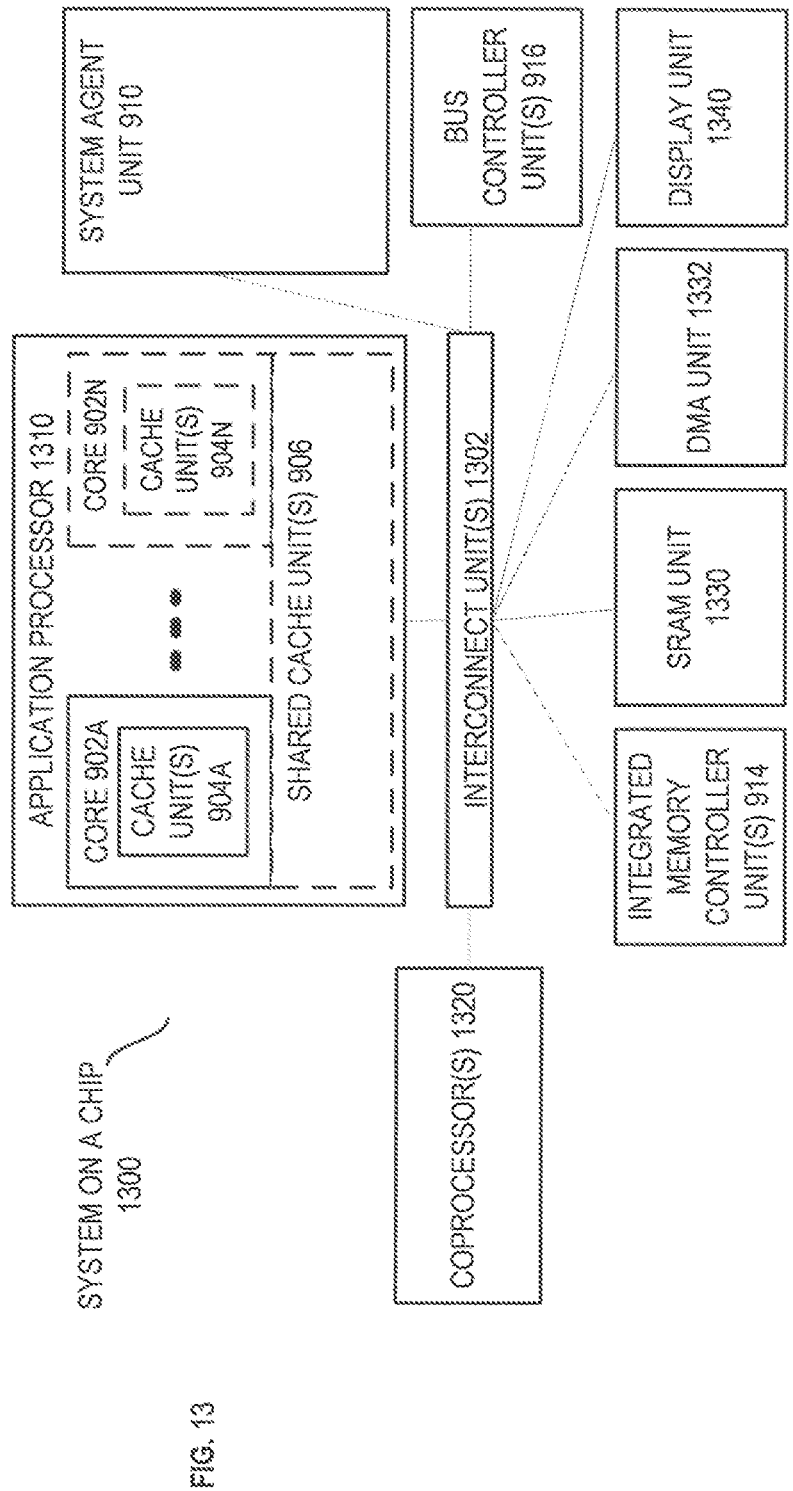

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 202A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (including binary translation, code morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 14:
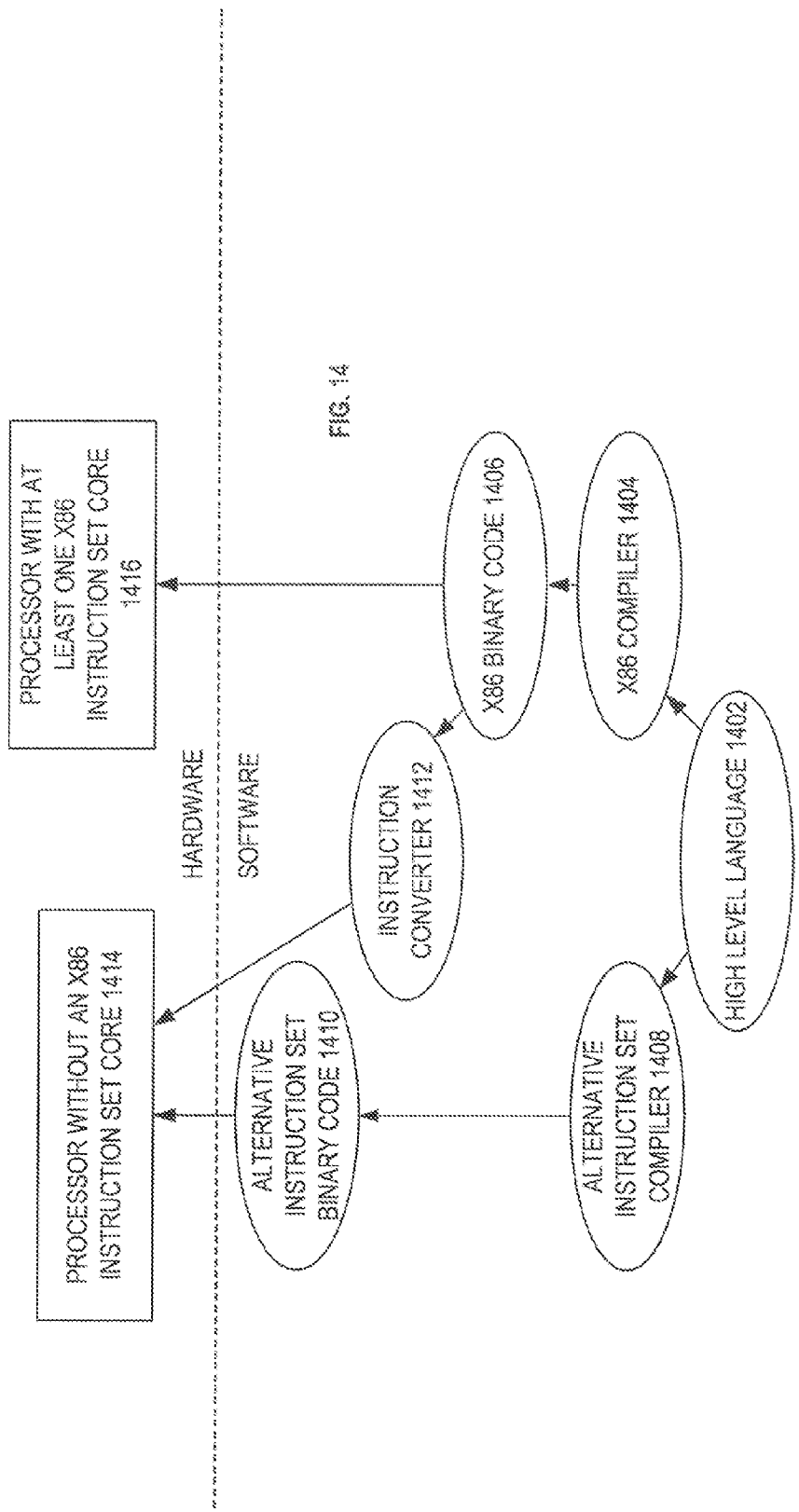
FIG. 14 is a block diagram contrasting the use of a software instruction converter to convert binary instructions in a source instruction set to binary instructions in a target instruction set according to embodiments of the invention.

FIG. 14 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

What is claimed is:

1. An apparatus comprising:
decode logic to decode an instruction, the instruction including a first source writemask operand and a destination writemask operand;
execution logic to execute the decoded instruction to find a trailing least significant zero bit position in the first source writemask operand and set the destination writemask operand to have values of the first source writemask operand, but with all bit positions closer to a most significant bit position than a trailing least significant zero bit position in the first source writemask operand set to zero.

2. The apparatus of claim 1, wherein the instruction further includes a second source writemask operand and the trailing least significant zero bit position is a first bit position in the first source writemask operand set to zero where a corresponding bit position of the second source writemask operand is set to one.

3. The apparatus of claim 1, wherein the writemask operands are dedicated writemask registers.

4. The apparatus of claim 3, wherein the dedicated writemask registers are 8 or 16-bit in size.

5. The apparatus of claim 1, wherein the writemask operands are general purpose registers.

6. The apparatus of claim 1, wherein the execution logic to evaluate each bit position of the first source operand serially from least significant to most significant.

7. The apparatus of claim 6, wherein a counter is used by the execution logic to determine when all of the bit positions have been evaluated.

8. A method comprising:
decoding an instruction including a first source writemask operand and a destination writemask operand;
executing the decoded instruction to:
find a trailing least significant zero bit position in the first source writemask operand, and
set the destination writemask operand to have values of the first source writemask operand, but with all bit positions closer to a most significant bit position than the trailing least significant zero bit position in the first source writemask operand set to zero.

9. The method of claim 8, wherein the instruction further includes a second source writemask operand and the trailing least significant zero bit position is a first bit position in the first source writemask operand set to zero where a corresponding bit position of the second source writemask operand is set to one.

10. The method of claim 8, wherein the writemask operands are dedicated writemask registers.

11. The method of claim 10, wherein the dedicated writemask registers are 8 or 16-bit in size.

12. The method of claim 8, wherein the writemask operands are general purpose registers.

13. The method of claim 8, wherein each bit position of the first source writemask operand is evaluated serially from least significant to most significant.

14. The method of claim 13, further comprising:
determining when all of the bit positions have been evaluated based on a counter.

15. A non-transitory machine-readable medium including code which when executed by a processor causes the processor to execute a method to perform method, the method comprising:
decoding an instruction including a first source writemask operand and a destination writemask operand;
executing the decoded instruction to:
find a trailing least significant zero bit position in the first source writemask operand, and
set the destination writemask operand to have values of the first source writemask operand, but with all bit positions closer to a most significant bit position than the trailing least significant zero bit position in the first source writemask operand set to zero.

16. The non-transitory machine-readable medium of claim 15, wherein the instruction further includes a second source writemask operand and the trailing least significant zero bit position is a first bit position in the first source writemask operand set to zero where a corresponding bit position of the second source writemask operand is set to one.

17. The non-transitory machine-readable medium of claim 15, wherein the writemask operands are dedicated writemask registers.

18. The non-transitory machine-readable medium of claim 17, wherein the dedicated writemask registers are 8 or 16-bit in size.

19. The non-transitory machine-readable medium of claim 15, wherein the writemask operands are general purpose registers.

20. The non-transitory machine-readable medium of claim 15, wherein each bit position of the first source writemask operand is evaluated serially from least significant to most significant.

* * * * *